(12) United States Patent
West et al.

(10) Patent No.: US 9,139,037 B2
(45) Date of Patent: Sep. 22, 2015

(54) ERASABLE AND REPLACEABLE TOOL LABEL

(71) Applicants: Walter David West, Commcak, NY (US); Linda Cathy Posillico, Commack, NY (US)

(72) Inventors: Walter David West, Commcak, NY (US); Linda Cathy Posillico, Commack, NY (US)

( * ) Notice: Subject to any disclaimer, the term of this patent is extended or adjusted under 35 U.S.C. 154(b) by 119 days.

(21) Appl. No.: 14/057,949

(22) Filed: Oct. 18, 2013

(65) Prior Publication Data

US 2014/0170360 A1 Jun. 19, 2014

Related U.S. Application Data

(60) Provisional application No. 61/738,889, filed on Dec. 18, 2012.

(51) Int. Cl.
*B43L 1/00* (2006.01)
*G09F 3/10* (2006.01)
*B43L 7/00* (2006.01)
*G01B 3/10* (2006.01)

(52) U.S. Cl.
CPC . *B43L 1/00* (2013.01); *B43L 1/008* (2013.01); *B43L 7/005* (2013.01); *G09F 3/10* (2013.01); *G01B 2003/1094* (2013.01); *Y10T 428/14* (2015.01); *Y10T 428/149* (2015.01); *Y10T 428/1476* (2015.01); *Y10T 428/15* (2015.01)

(58) Field of Classification Search
CPC ........... B43L 1/00; B43L 1/008; B43L 7/005; G09F 3/10; Y10T 428/1476; Y10T 428/14; Y10T 428/1486; G01B 2003/1094
See application file for complete search history.

(56) References Cited

U.S. PATENT DOCUMENTS

| 4,587,146 | A | * | 5/1986 | Anhauser et al. | ............ 428/42.2 |
| 5,024,332 | A | * | 6/1991 | Stachler | ........................ 206/575 |
| 5,316,343 | A | * | 5/1994 | Waldhoff | ........................ 283/70 |

* cited by examiner

Primary Examiner — Patricia L Nordmeyer

(57) ABSTRACT

A reusable and replaceable tool label has a thin rigid body, an adhesive coating, and a removable liner. The thin rigid body is built from first face and a second face, which are connected by a lateral surface. The first face is a writable surface, and is used to record measurements, notes, and other information to the label. The second face allows the label to be attached to tools and other surface, by means of the adhesive coating that is placed on the second face. To prevent the label from sticking to a surface during packaging, transport, and storage, a removable liner is placed over the adhesive coating. The removable liner has a linear cut that makes the removable liner easier to grab. A tab may be connected to the removable linear to make peeling the removable liner away from the adhesive coating even easier.

2 Claims, 8 Drawing Sheets

ERASABLE AND REPLACEABLE TOOL LABEL

The current application claims a priority to the U.S. Provisional Patent application Ser. No. 61/738,889 filed on Dec. 18, 2012.

FIELD OF THE INVENTION

The present invention relates generally to a reusable writing surface which can be attached to surface or object.

BACKGROUND OF THE INVENTION

Individuals working in different environments often have a need for a label that they can easily change. Often times a task requires both measuring and recording data. Normally this is accomplished with separate products, such as measuring with a tape measure and then writing the information down on a notepad. While this is viable, there remains room for improvement. By combining an erasable label with a measuring tool, less time is spent switching between the measurement tool and a notepad. This is especially beneficial when taking measurements at remote or hazardous locations. For example, in the construction industry an erasable label can be attached to a tape measure. This is a great time saver in certain situations, such as taking measurements while on a ladder. Rather than having to juggle a writing utensil, tape measure, and notepad, a worker can simply record the measurements to the attached erasable label. This is even more advantageous when the notepad is left on the ground, which would require the worker to take measurements, remember them, and then descend the ladder to write down the measurements. The reusable nature of the label is another benefit, as it is useful to be able to change the label as circumstances dictate. This means one label can be used for several different tools, although not simultaneously.

It is therefore an object of the present invention to provide a reusable writing surface that can be attached to an object. It is a further object of the present invention to provide a "write n swipe" or "write n wipe" device that can be erased by running a finger across the reusable writing surface.

DETAIL DESCRIPTIONS OF THE INVENTION

Figure 1:
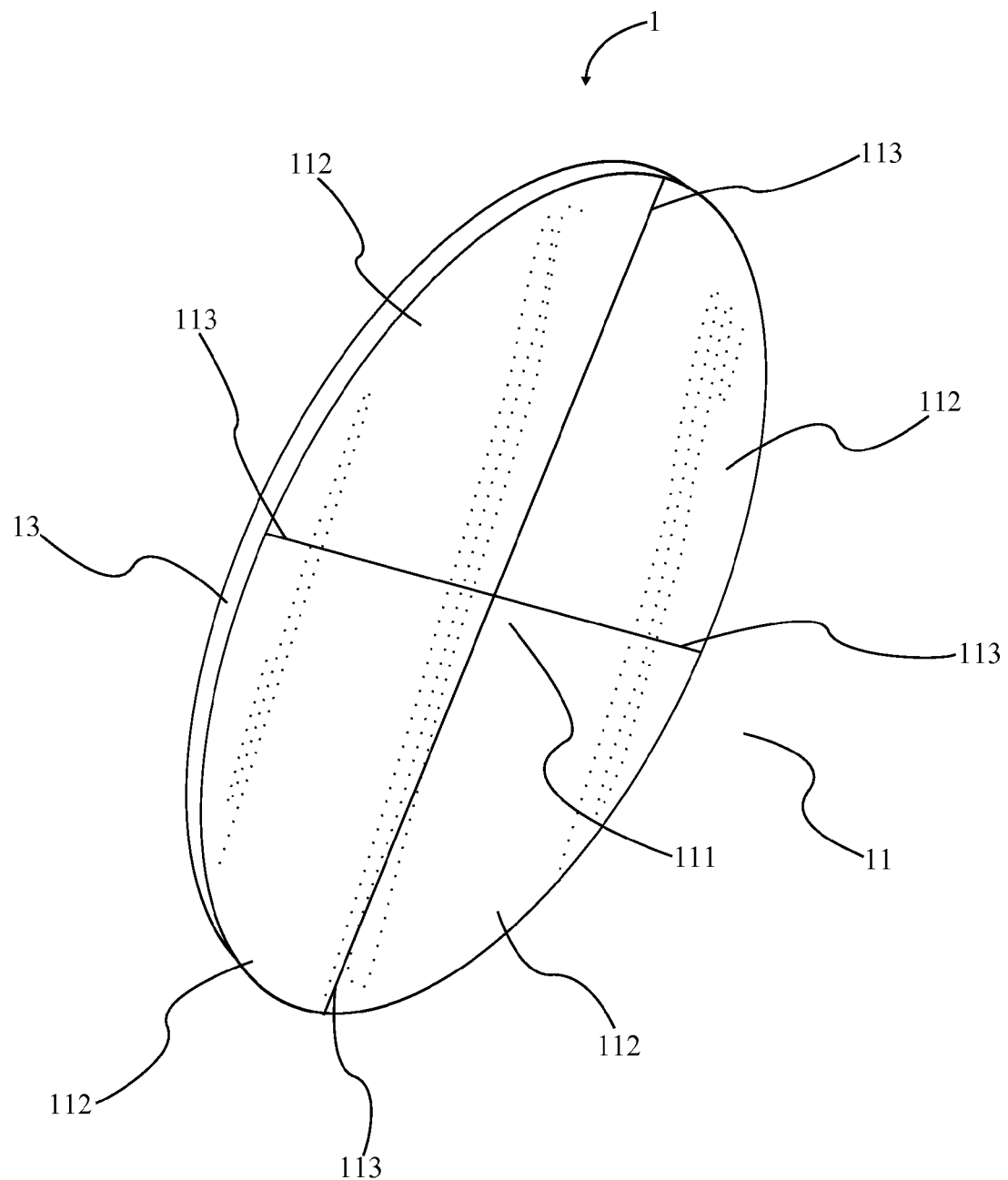
FIG. 1 is a perspective view of the present invention.

All illustrations of the drawings are for the purpose of describing selected versions of the present invention and are not intended to limit the scope of the present invention.

The present invention is an erasable and replaceable tool label that allows measurements and other simple observations to be quickly recorded. The present invention provides a reusable writing surface and is adapted to be affixed to an item. The present invention is designed to be used with tools, such as a tape measure. The present invention comprises a thin rigid body 1, an adhesive coating 2, and a removable liner 3. The adhesive coating 2, which covers one surface of the rigid body, allows the present invention to be secured to any suitable surface. The removable liner 3 is placed over the adhesive coating 2, protecting the adhesive coating 2 during storage and preventing the present invention from accidently attaching to a surface.

The thin rigid body 1, which is shown in FIG. 1-FIG. 8, comprises a first face 11, a second face 12, and a lateral surface 13. The first face 11 and the second face 12 form opposite surfaces of the thin rigid body 1, each being positioned next to the lateral surface 13. The first face 11 and second face 12 are aligned with the lateral surface 13, such that the perimeter of the lateral surface 13 is coincident with the perimeters of the first face 11 and the second face 12. The first face 11 and the second face 12 are connected to the lateral surface 13, forming a top, a bottom, and a side of the thin rigid body 1. In the preferred embodiment the lateral surface 13 is perpendicular to the first face 11 and the second face 12, acting as a flat perimeter surface to the thin rigid body 1.

Figure 5:
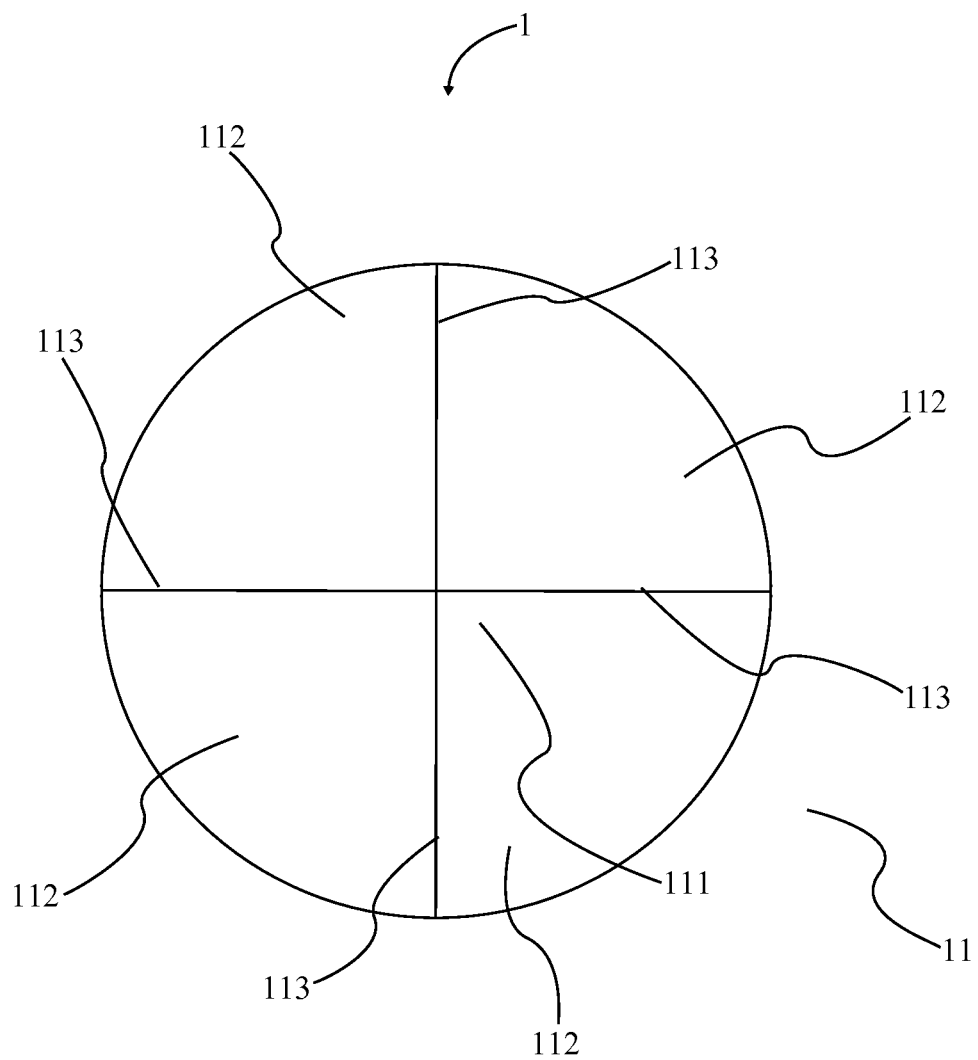
FIG. 5 is a top view of the present invention, showing the writable surface.
Figure 6:
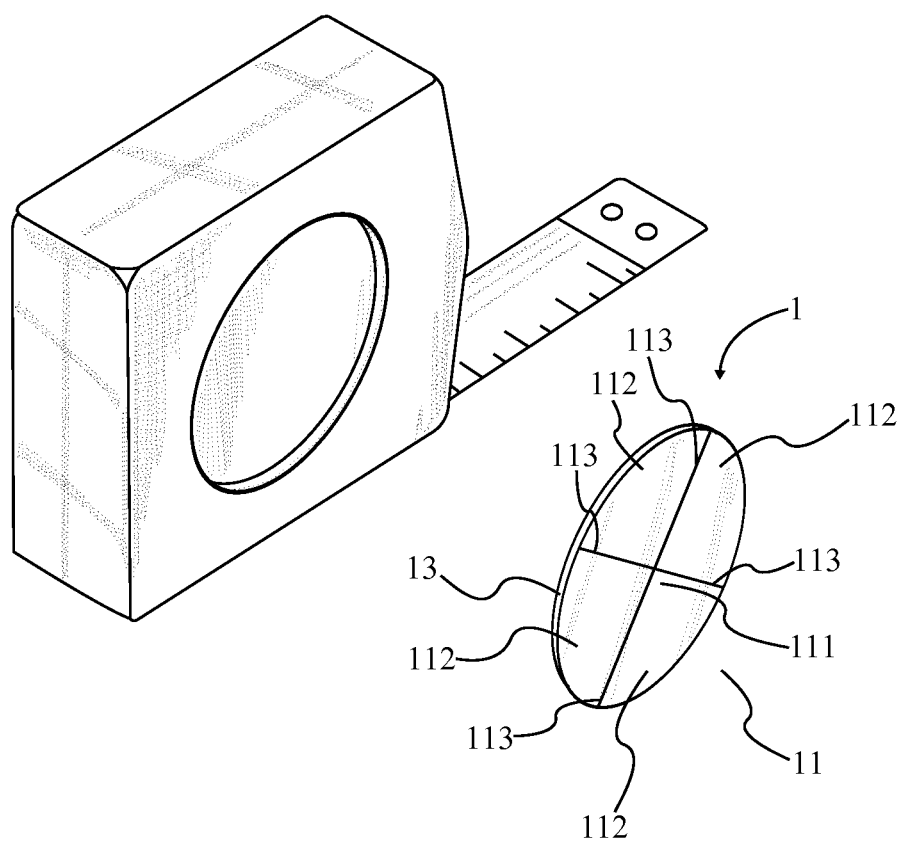
FIG. 6 is a perspective view showing the present invention and a tape measure with a recess for the present invention.
Figure 7:
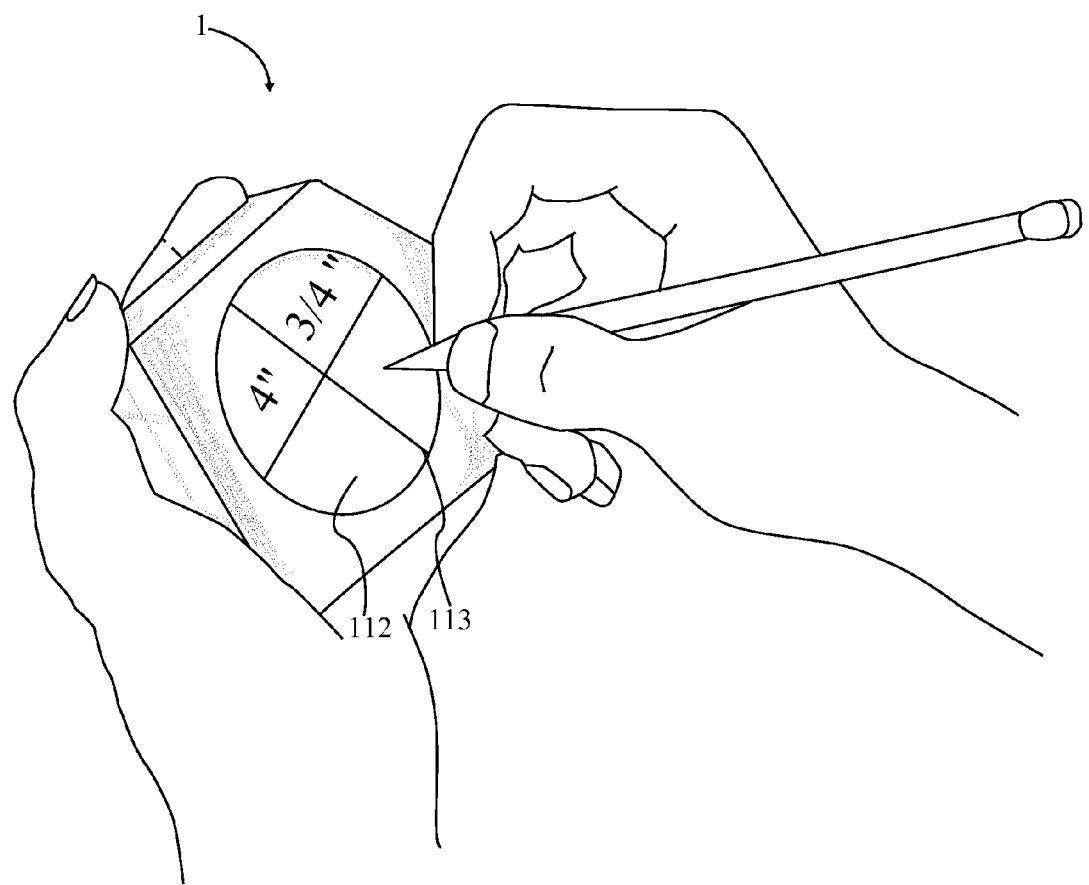
FIG. 7 is a perspective view showing the present invention attached to the tape measure, with dimensions being recorded to the present invention.

Visible in FIG. 1 and FIG. 5-FIG. 7, the first face 11 is designed to be a writable surface 111, such that notes and other marks may be written to it using pencils, markers, or other writing utensils. The writeable surface comprises a plurality of sections 112. The plurality of sections 112 provides an easy way to group notes and other information written on the writable surface 111, as seen in FIG. 5-FIG. 7. In the preferred embodiment, each of the plurality of sections 112 is a quadrant 114, dividing the writing surface into a total of four sections 112. Each of these sections 112 is outlined by a boundary marking 113, which provides a visual delineation for the plurality of sections 112. The boundary marking 113, visible in FIG. 5-FIG. 7, can be implemented in a number of ways, such as a separate laminated strip, a permanent ink, or a thin strip of weather resistant tape. As long as the boundary marking 113 is capable of clearly distinguishing one of the sections 112 from the adjacent sections 112, other methods may also be used to create the boundary marking 113.

Figure 2:
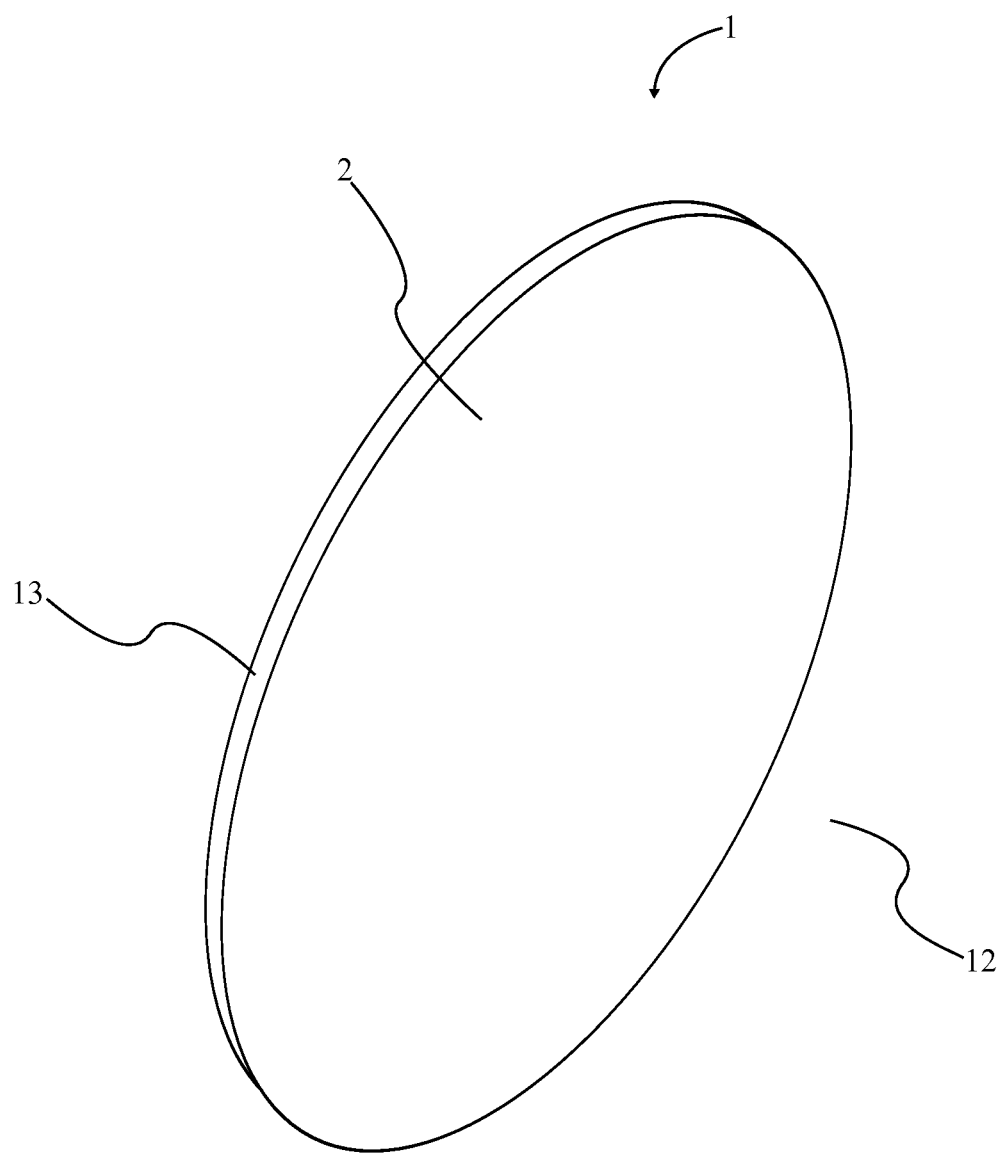
FIG. 2 is a rear perspective view of the present invention, with the removable liner omitted.

The second face 12, shown in FIG. 2, is designed to allow the present invention to be secured to a surface, by means of the adhesive coating 2. The adhesive coating 2, also illustrated in FIG. 2, is positioned across the second face 12, serving as a point of contact between the thin rigid body 1 and a separate surface. Attached across the adhesive coating 2, opposite the second face 12, is the removable liner 3. The removable liner 3 completely covers the adhesive coating 2, preventing the present invention from accidently sticking to a random surface, until a user is ready to place the present invention.

Figure 3:
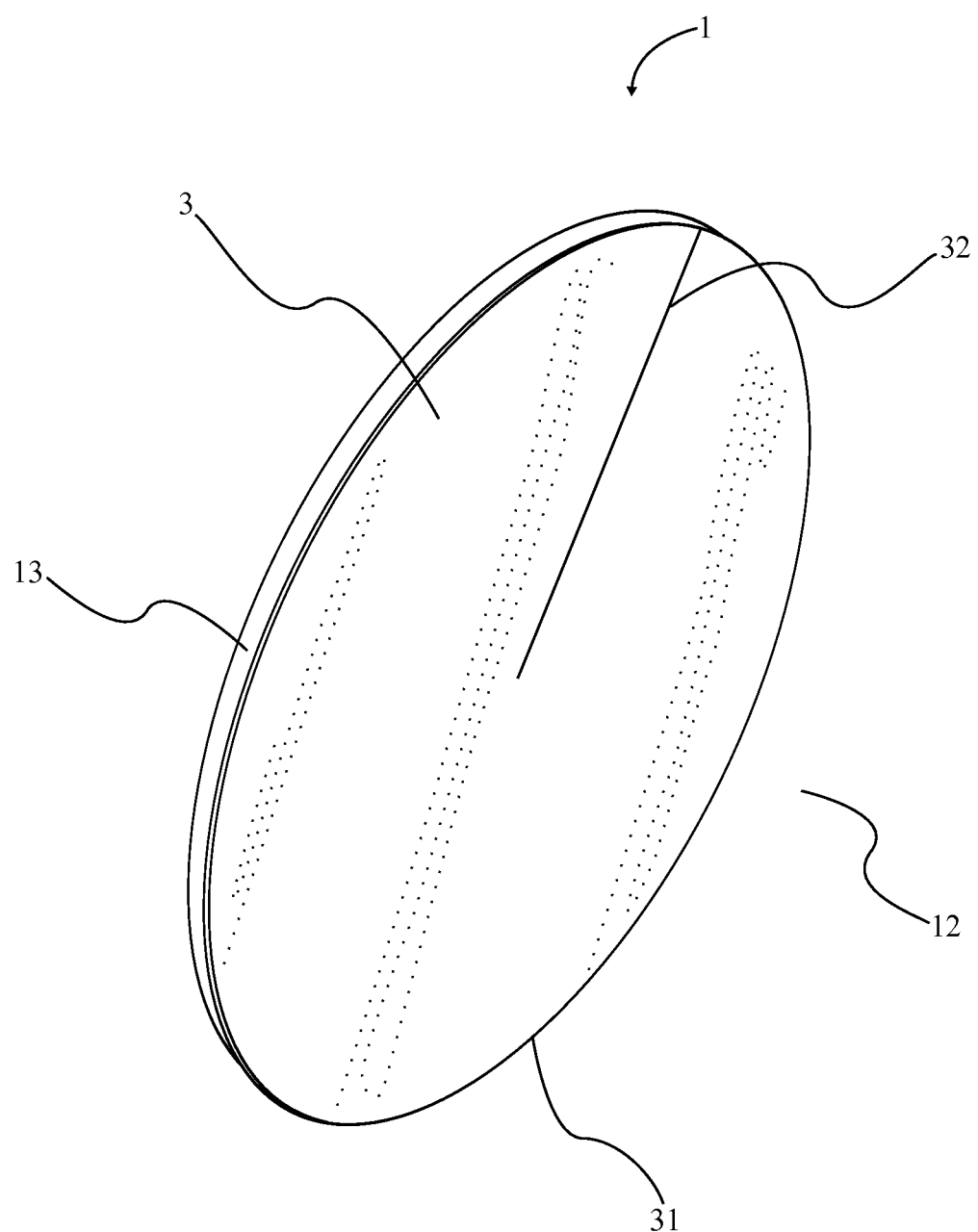
FIG. 3 is a rear perspective view of the present invention, including the removable liner.
Figure 4:
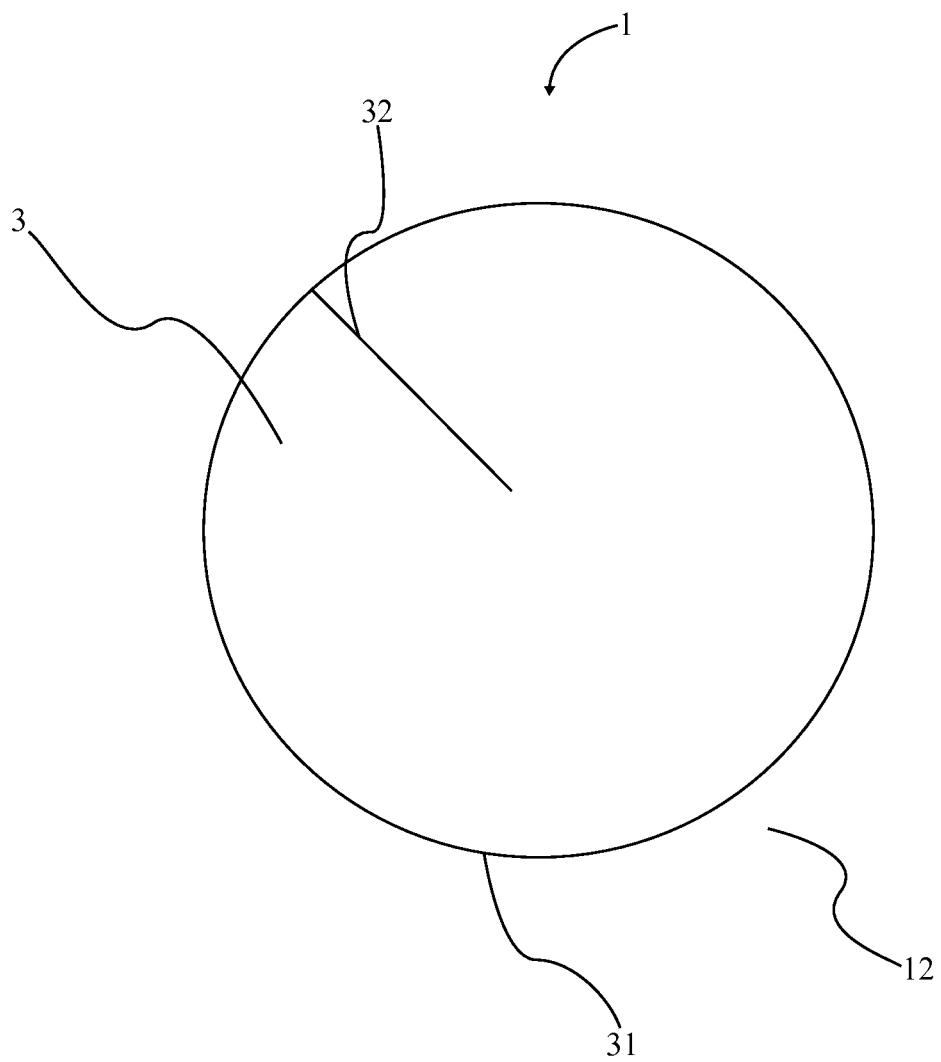
FIG. 4 is a bottom view of the present invention, showing the removable liner.

In the preferred embodiment depicted in FIG. 3 and FIG. 4, the removable liner 3 comprises an exterior edge 31 and a linear cut 32. The exterior edge 31 is aligned with the perimeter of the second face 12, such that the exterior edge 31 is coincident with the perimeter of the second face 12. The linear cut 32 forms a tear across part of the removable liner 3, beginning at the exterior edge 31 and travelling partially into the removable liner 3. The linear cut 32 creates a flap for the removable liner 3, allowing a user to peel the removable liner 3 away from the adhesive coating 2 by pulling the flap. The flap increases usability of the present invention, as without a flap a user would have to peel the removable liner 3 away from an edge, which is difficult to do without a flap or similar component the user can grab.

Figure 8:
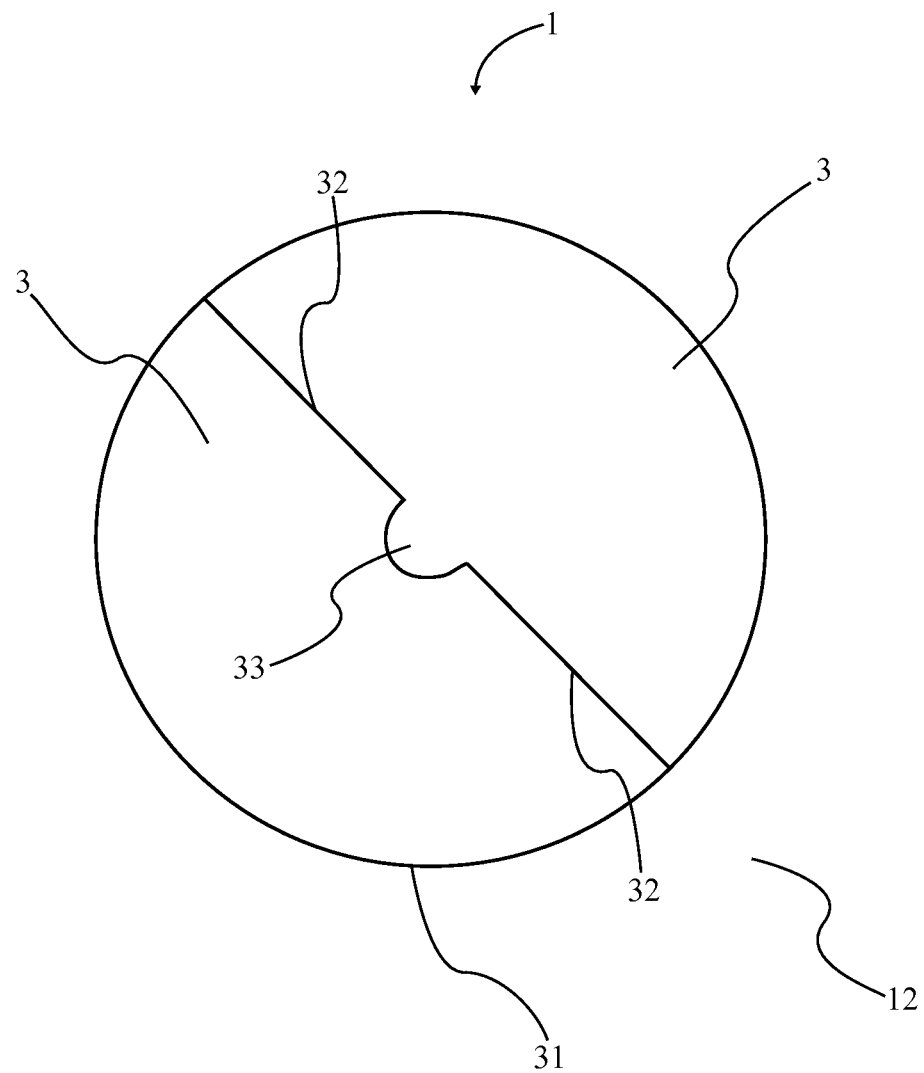
FIG. 8 is a bottom view of the present invention, showing a variant design for the removable liner.

In another embodiment, shown in FIG. 8, the removable liner 3 comprises an exterior edge 31, a linear cut 32, and a tab 33. This other embodiment is similar to the preferred embodiment in that the exterior edge 31 is perimetrically aligned with the perimeter of the second face 12. The linear cut 32, while still originating at the exterior edge 31, travels completely across the removable line, terminating upon reencountering the exterior edge 31. In this other embodiment, the linear cut 32 bisects the removable liner 3, cutting the removable liner 3 into two adjacent parts. To help a user grab one of these two parts, the tab 33 is connected to the removable liner 3 adjacent to the linear cut 32. Similar to the flap created in the preferred embodiment, the tab 33 allows a user to easily grab the removable liner 3 and peel it away from the adhesive coating 2.

The writable surface 111 allows a user to record measurements or take notes by means of the present invention. In addition, the writable surface 111 is erasable; by rubbing the writable surface 111 with a finger or other suitable wipe, information written to the writable surface 111 can be removed. The writable surface 111 provides a convenient and reusable notepad, especially when performing carpentry, general home improvement, or any task that might involve recording observations or measurements. In order to make the thin rigid body 1 easily accessible, the thin rigid body 1 can be attached to a tool using the adhesive coating 2. This is accomplished by first peeling the removable liner 3 away from the adhesive coating 2, which can then be pressed to any suitably shaped flat surface, such as the body of a tape measure. The writable surface 111 is thus conveniently placed and allows for quick notes to be taken without the need for a pencil and paper or other traditional writing materials.

The writable surface 111 is designed to be compatible with a number of writing instruments, examples of which include pencils and dry-erase markers. Other compatible writing instruments may be used as well, wherein a compatible writing instrument is capable of making marks on the writable surface 111 and said marks can be erased by wiping them away.

The plurality of sections 112 form a grid on the writable surface 111, which help with organization of recorded data and comments. Reference points, such as the boundary marking 113, help a user to separate the recorded data into groups. For example, if measuring to see if a table or dresser will fit into a corner space, the width, depth, and height of the table can be measured and written to separate sections 112 on the writable surface 111. A user can then measure the corner space, comparing each corner space measurement with the corresponding table measurements that have been recorded on the writable surface 111. A checkmark can be placed next to a table dimensions which are smaller than the corresponding corner space dimensions, while an "x" can be used to mark table dimensions which are larger than the corresponding corner space dimensions. This is beneficial to the user, as they can simply record dimensions to the measurement tape rather than having to switch between a notepad and measurement tape.

In the preferred embodiment the thin rigid body 1 takes the shape of a disc, with a diameter of 2 and ½ inches and a thickness of 1/16 inch. The material used to make the thin rigid body 1 is a laminated plastic such as Formica™. Such a material is beneficial due to strength, durability, and water resistance. The lack of toxicity is an additional benefit to using laminated plastics. The shape of the thin rigid body 1 is laser cut from a full sheet of white polished Formica™. The adhesive coating 2 is made from a pressure-sensitive adhesive, which allows to present invention to easily be attached to a surface by simply pressing the adhesive coating 2 against the intended supporting surface.

In other embodiments, the present invention may be constructed with different materials, sizes, and shapes. The thin rigid body 1 can be of any shape, geometry, or even without regular form as required by a particular application. In order for the present invention to function optimally, the material used to make the thin rigid body 1 must be durable, capable of being written on, and capable of easily being erased by rubbing a finger or cloth over the writing surface. The linear cut 32 can instead take the form of a curve, wave, or other pattern as long as it serves the function of allowing the removable liner 3 to be peeled off. Potentially, other embodiments could replace the adhesive coating 2 with a component that utilizes a different method of attachment. For example, rather than applying an adhesive coating 2 to the second face 12, the second face 12 or even entire thin rigid body 1 can instead be magnetized. This would allow the present invention to be attached to a metallic surface, such as a tape measure or ruler with a metal body. To make the present invention easier to attach to a various surfaces, the size and shape of the thin rigid body 1 can be altered. For example, if attaching the present invention to a ruler rather than a tape measure, the thin rigid body 1 can be made with a long rectangular shape rather than a circular shape.

Though the present invention is described as being used with tools and related home improvement products, the present invention can be used with any suitable surface in a variety applications. The present invention can be used in numerous areas, with marine applications, underwater applications, and waterproofing applications being just a few examples. The surfaces to which the thin rigid body 1 attaches to are not limited to tools; the present invention can be used with lighters (e.g. to keep track of how many cigarettes have been smoked that day), coasters (e.g. writing down what types of coffee or teas guests have requested), memo pads (e.g. to keep costs down by reducing use of consumable paper), and numerous other products. The present invention is designed so that it may be removed from a surface and attached to another surface; a user can switch the present invention between surfaces and tools as needed. As a result, a user does not need to buy a multiples of the present invention to use for separate tasks, as one copy can be switched between tasks as appropriate.

While the present invention is designed to be attached to a number of tools and surfaces, tools can be sold with the present invention already attached, such as with the tape measure shown in FIG. 6 and FIG. 7. This allows the thin rigid body 1 to be designed with dimensions that best fit the specific tool or surface, such as the disc-shaped thin rigid body 1 that is used with the measuring tape.

Although the invention has been explained in relation to its preferred embodiment, it is to be understood that many other possible modifications and variations can be made without departing from the spirit and scope of the invention as hereinafter claimed.

What is claimed is:
1. An erasable and replaceable tool label comprises:
A circular thin rigid body;
the thin rigid body comprises a first face, a second face, and a lateral surface;
an adhesive coating;
a circular removable liner;

the first face and the second face being positioned opposite each other across the lateral face;
the lateral surface being perimetrically connected to the first face;
the lateral surface being perimetrically connected to the second face;
the adhesive coating being positioned across the second face;
the removable liner being adjacently attached to the adhesive coating, wherein the adhesive coating is covered by the removable liner;
the first face being perpendicular to the lateral surface;
the second face being perpendicular to the lateral surface;
the first face being a plain white writable surface having no indicia;
the writable surface comprises quadrants;
the writable surface being compatible with pencils;
the writable surface being erasable, wherein marks can be applied to and removed from the writable surface;
each of the quadrants being delineated by a boundary marking;
wherein the boundary marking is a thin strip of weather resistant tape;
the removable liner comprises an exterior edge and a linear cut;
the exterior edge being perimetrically aligned with the second face; and
the linear cut extending from the exterior edge to a center point of the removable liner.

2. An erasable and replaceable tool label comprises:
A circular thin rigid body;
the thin rigid body comprises a first face, a second face, and a lateral surface;
an adhesive coating;
a circular removable liner;
the first face and the second face being positioned opposite each other across the lateral surface;
the lateral surface being perimetrically connected to the first face;
the lateral surface being perimetrically connected to the second face;
the adhesive coating being positioned across the second face;
the removable liner being adjacently attached to the adhesive coating, wherein the adhesive coating is covered by the removable liner;
the first face being perpendicular to the lateral surface;
the second face being perpendicular to the lateral surface;
the first face being a plain white writable surface having no indicia;
the writable surface comprises quadrants;
the writable surface being compatible with pencils;
the writable surface being erasable, wherein marks can be applied to and removed from the writable surface;
each of the quadrants being delineated by a boundary marking;
wherein the boundary marking is a thin strip of weather resistant tape;
the exterior edge being perimetrically aligned with the second face;
the removable liner comprises an exterior edge and a cut comprising a first linear segment, a second linear segment, and a semi-circular segment;
the semi-circular segment being located concentrically with respect to the removable liner;
the first linear segment extending from the exterior edge to a first end of the semi-circular segment, and bisecting the removable liner;
the second linear segment extending from the exterior edge to a second end of the semi-circular segment, and bisecting the removable liner;
the semi-circular segment forming a tab; and
wherein the removable liner can be peeled off the adhesive coating by grasping the tab.

* * * * *